United States Patent [19]

Marshall et al.

[11] Patent Number: 4,550,935
[45] Date of Patent: Nov. 5, 1985

[54] QUICK-RELEASE COUPLING

[75] Inventors: Lloyd B. Marshall, Sorbiers; Faycal Ghebrid, Saint-Etienne, both of France

[73] Assignee: Etudes et Fabrication Dowell Schlumberger, France

[21] Appl. No.: 451,538

[22] Filed: Dec. 21, 1982

[30] Foreign Application Priority Data

Dec. 23, 1981 [FR] France ............................. 81 24461

[51] Int. Cl.⁴ ............................................. F16L 35/00
[52] U.S. Cl. .................................... 285/18; 285/364; 285/DIG. 21
[58] Field of Search ............... 285/364, 365, 406, 407, 285/421, DIG. 21, 18

[56] References Cited
U.S. PATENT DOCUMENTS

| | | |
|---|---|---|
| 3,231,298 | 1/1966 | Tomb et al. ................. 285/421 X |
| 3,627,358 | 12/1971 | Polston . |
| 3,744,825 | 7/1973 | Cooper et al. . |
| 3,754,780 | 8/1973 | Pogonowski ............... 285/421 X |
| 3,847,413 | 11/1974 | Gurley et al. . |
| 4,049,297 | 9/1977 | Reneau ........................ 285/365 X |
| 4,153,278 | 5/1979 | Ahlstone . |
| 4,222,591 | 9/1980 | Haley ........................ 285/DIG. 21 |
| 4,295,670 | 10/1981 | Goodall et al. . |
| 4,306,739 | 12/1981 | Bormioli ...................... 285/365 |
| 4,327,942 | 5/1982 | Abbes et al. ................. 285/365 |

FOREIGN PATENT DOCUMENTS

| | | |
|---|---|---|
| 595401 | 4/1934 | Fed. Rep. of Germany ...... 285/365 |
| 2476794 | 8/1981 | France . |
| 1201471 | 8/1970 | United Kingdom . |
| 129441 | 1/1960 | U.S.S.R. ........................... 285/364 |

*Primary Examiner*—Dave W. Arola
*Attorney, Agent, or Firm*—Ostrolenk, Faber, Gerb & Soffen

[57] ABSTRACT

The invention relates to a quick-release coupling, more particularly intended for hose pipe assemblies used at sea.

Said coupling is composed of two jaws which cooperate with truncated parts of the coupling members and are held together or released by the movement of a finger sliding inside bores provided in said jaws.

The coupling according to the invention offers improved efficiency and reliability.

6 Claims, 5 Drawing Figures

QUICK-RELEASE COUPLING

BACKGROUND OF THE INVENTION

The present invention relates to a quick release coupling, more particularly but not exclusively intended for hose pipe assemblies to be used at sea.

To transfer products in liquid, powdery or paste form between two either on-shore or off-shore installations, such as ships, pontoons, barges or fixed on-shore installations, or between a ship and an off-shore drilling platform, it is conventionally known to use hose pipes, namely non rigid pipes, in order to allow the relative displacements of their ends, displacements which are caused for example by the swell.

FIG. 1 hereto illustrates the special case of a ship 3 tied to an off-shore drilling platform 4 by way of a flexible pipe 2, which flexible pipe 2 is connected either to the ship 3 or to the platform 4 by way of a quick release coupling, respectively 5a–5b. Said coupling is designed to disconnect instantly the ship from the platform so that if the need arises, because for example of a well blowing out or a storm starting, the ship can sail away from said platform before it can drift towards it or sink with it.

A coupling of this type is already known from U.S. Pat. No. 3,847,413, which consists of a male coupling section fitting into a female coupling section integral with an annular locking assembly covering the male section, on either side of the fitting in area. The locking assembly is composed on the one hand of diametral walls and annular walls, defining an annular chamber, and on the other hand, of a hydraulic piston movable inside said chamber between a locking position and an unlocking position, locking ball elements being further provided in the radial bores of the inner annular walls and being insertable in spherical recesses provided in the male tubular element.

Due to the fact that a longitudinally moving piston is used both for initiating the locking and for the actual locking and unlocking operations the locking assembly is very long.

Also, due to the high pressures which prevail inside the coupling reaching up to 1000 bars, it is important to produce joints with hardly any play and of great length, which of course adds even more to the overall length of the assembly.

With this construction, when disconnecting, and just when the locking assembly is in the unlocking position, it may happen that two tubular male and female elements of the coupling do not separate one from the other due to a jamming of their contacting surfaces. The jamming is due to the reciprocal jointing length, to to the fact that there is little play in the joint, to the external conditions causing a misalignment of the male and female elements, and to the pressure prevailing inside the coupling which pressure generates hydraulic plastering phenomena.

Another coupling is also known wherein the male and female connection members are pressed together tightly end-to-end, by way of a peripheral clamp comprising a plurality of longitudinal independent fingers capable of oscillating between a locking position and an unlocking position in relation to the displacements of an annular piston in contact with their outer face. Each finger is provided, first, at one of its ends, with opposed truncated faces giving it a hooked shape and abutting, in the locking position, against the complementary truncated faces provided on the two flanges on either side of their contacting area and, second, with a sloping back face which, in the unlocking position, abuts against the periphery of one of the flanges. It can happen, with this kind of coupling, that when the two flanges are disconnected, and despite the longitudinal components which are due to the pressure and tend to move the two flanges apart, that the flange which is not associated to the fingers remains hooked under one or more of those fingers. In addition, this device, being composed of a large number of precise parts, is rather costly.

BRIEF DESCRIPTION OF THE INVENTION

It is the object of the present invention to propose a quick release coupling which is simple in design, inexpensive to produce, and reliable to use whatever the pressure and external stresses to which it is subjected.

The coupling according to the invention is of the type composed of two tubular members, male and female respectively, fitting tightly one into the other and comprising, on either side of their joining area, two opposed truncated faces designed to cooperate with complementary faces provided on the locking means.

According to the invention, these locking means comprise on the one hand, two separate transverse jaws joined together according to a plane which is substantially perpendicular to the longitudinal axis of the two tubular members of the coupling, each of said jaws being provided at its end with engaging means cooperating with complementary means provided on the other jaw, and comprising in its central part two semi-cylindrical recesses bordering a semi-circular groove with truncated side faces, adapted to come into abutment on the truncated faces of the tubular members of the coupling, and on the other hand, two assembling fingers which, being mounted for sliding in bores parallel to the longitudinal axis of the coupling and provided in the lateral engaging means of the two jaws, are connected to control means adapted to impart to said fingers a translation movement between two outermost positions, a locking position in which the two jaws are jointed and a disconnecting position in which at least one of the jaws is released.

Thus, when the coupling is in the connecting position, its two tubular members are held longitudially in sealed contact one against the other by the truncated side faces of the semi-circular grooves of the two jaws, which latter are positively joined together by the assembling fingers. As soon as said assembling fingers are returned to a disconnecting position, and due to the radial components exerted on the truncated faces of the tubular members and resulting from the pressures exerted on said tubular members, the two jaws move immediately apart, thus liberating the tubular members which, under the effect of the longitudinal components of the pressing forces, move longitudinally apart and thus cause the wanted disconnection.

Owing to its simple design and in particular to the use of two fairly narrow jaws opening radially although they are joined together by means moving longitudinally, the coupling according to the invention is very reliable and long-lasting whatever the disconnection frequency and whatever the forces exerted thereon through the medium and through external stresses.

According to one embodiment of the invention, the means controlling the assembling fingers are constituted, for each finger, by a hydraulic jack whose cylinder is joined to one of the jaws and whose piston rod constitutes the assembling finger.

The use of conventional type jacks, namely jacks with no annular piston, and the fitting of these jacks outside the structure ensuring the connection of the two tubular members enables to simplify the design of said structure and to make it thinner. This contributes to improving reliability, since when disconnecting, the distance covered by the tubular members in order to come out of the jaws is reduced as a result.

BRIEF DESCRIPTION OF THE DRAWINGS

The invention will be more readily understood on reading the following description with reference to the accompanying drawings, in which.

DETAILED DESCRIPTION OF THE PREFERRED EMBODIMENT

Figure 1:
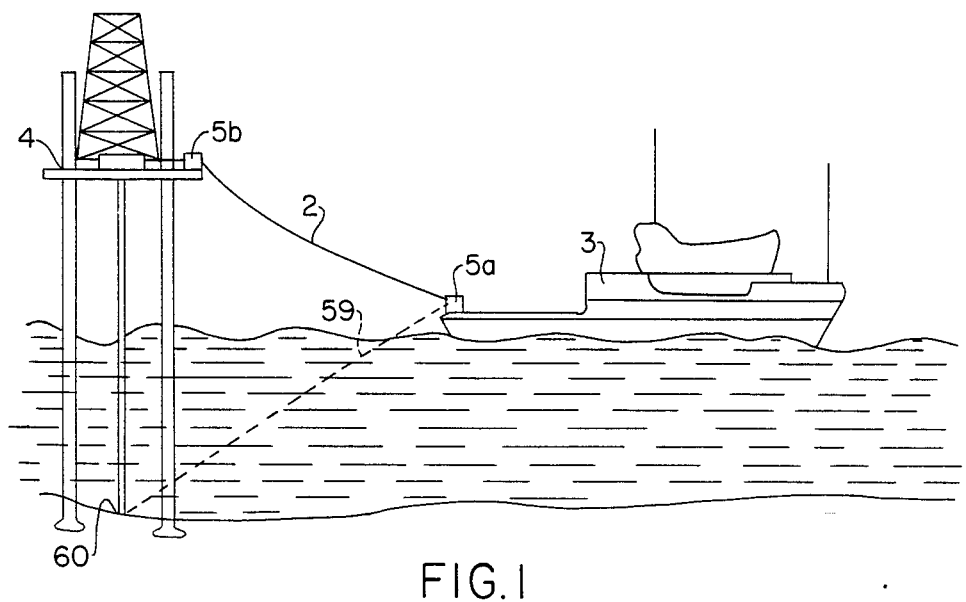
FIG. 1 is a diagrammatical side view showing the conditions in which the coupling according to the invention is used.

In known manner, the coupling according to the invention comprises two tubular members, respectively 7 and 8, provided at their ends with means for connecting them to 9 rigid pipe 9 and to 9 flexible pipe 10, respectively, the flexible pipe 10 being of the type adapted to deform in relation to the relative movements of the ship 3 with respect to the platform 4. The coupling 7 is provided at its free end with a threaded portion 12, on which is screwed a coupling nut 13 and with a bearing surface 14 against which abuts a complementary bearing surface provided at the end of the rigid pipe 9. The rigid pipe 9 is equipped at its end with a flange portion 15 against which are applied, via the nut 13, segments from a ring 16. The connection is made tight by way of a seal 17 placed inside a recess provided in the tubular member 7 and pressed in by the end face of the rigid pipe 9. The tubular member 8 is designed at its free end in the same way as the rigid pipe 9, so as to cooperate in the same conditions with the free end of the flexible pipe 10, which is designed like the end of the tubular element 7.

Figure 2:
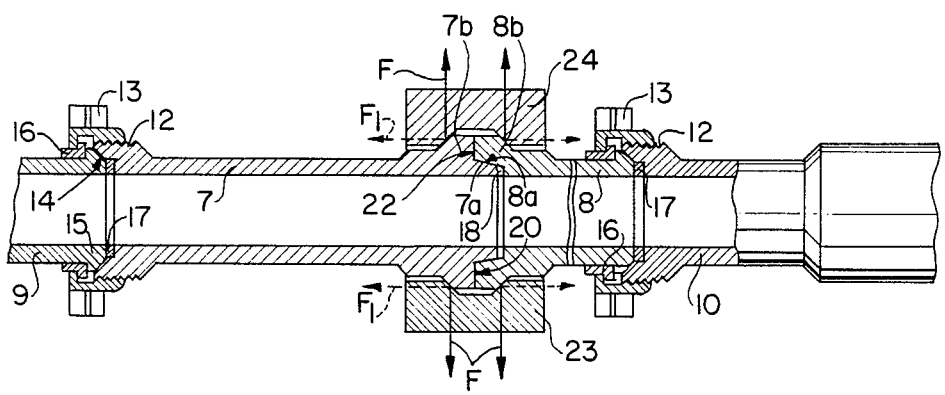
FIG. 2 is a partial longitudinal section of a side view showing one embodiment of the coupling according to the invention.
Figure 3:
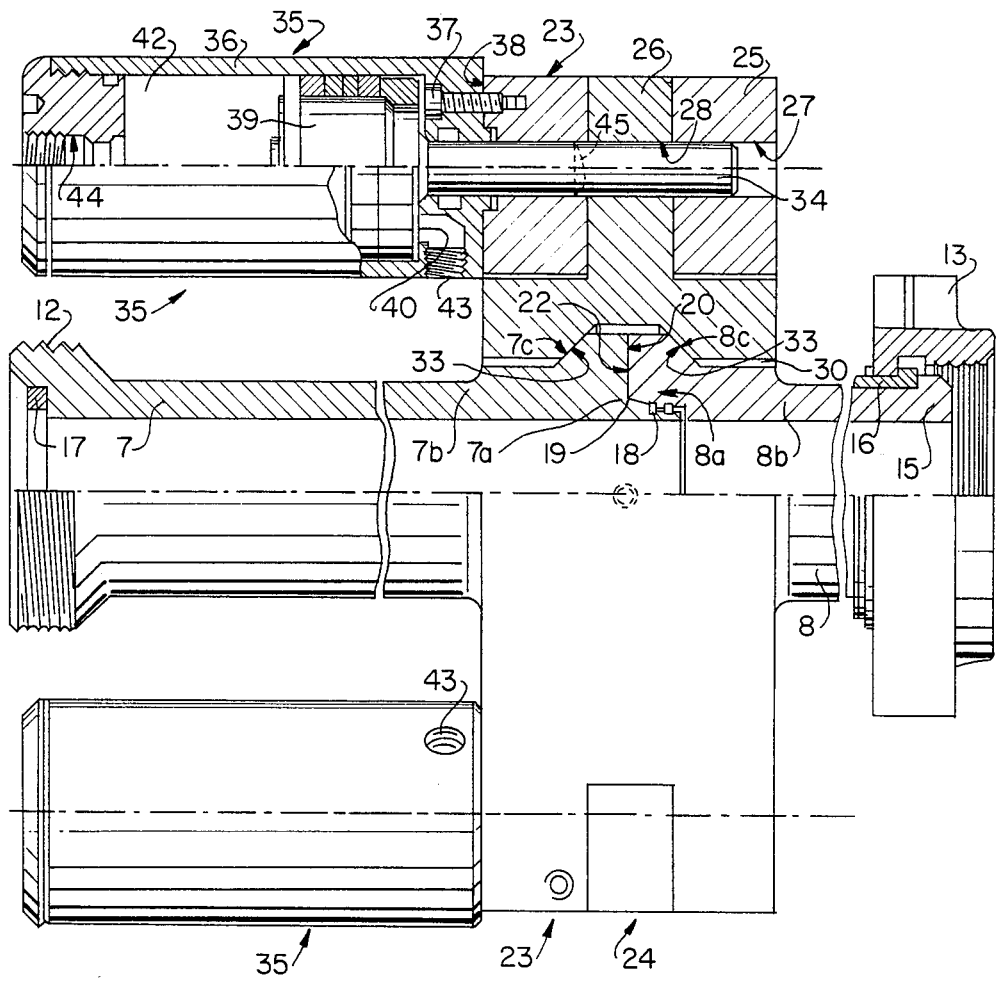
FIG. 3 is a half-elevational and half-cross-sectional side view showing said embodiment on an enlarged scale and with a longitudinal section plane which is set off by 90° C. with respect to that used in FIG. 2.
Figure 4:
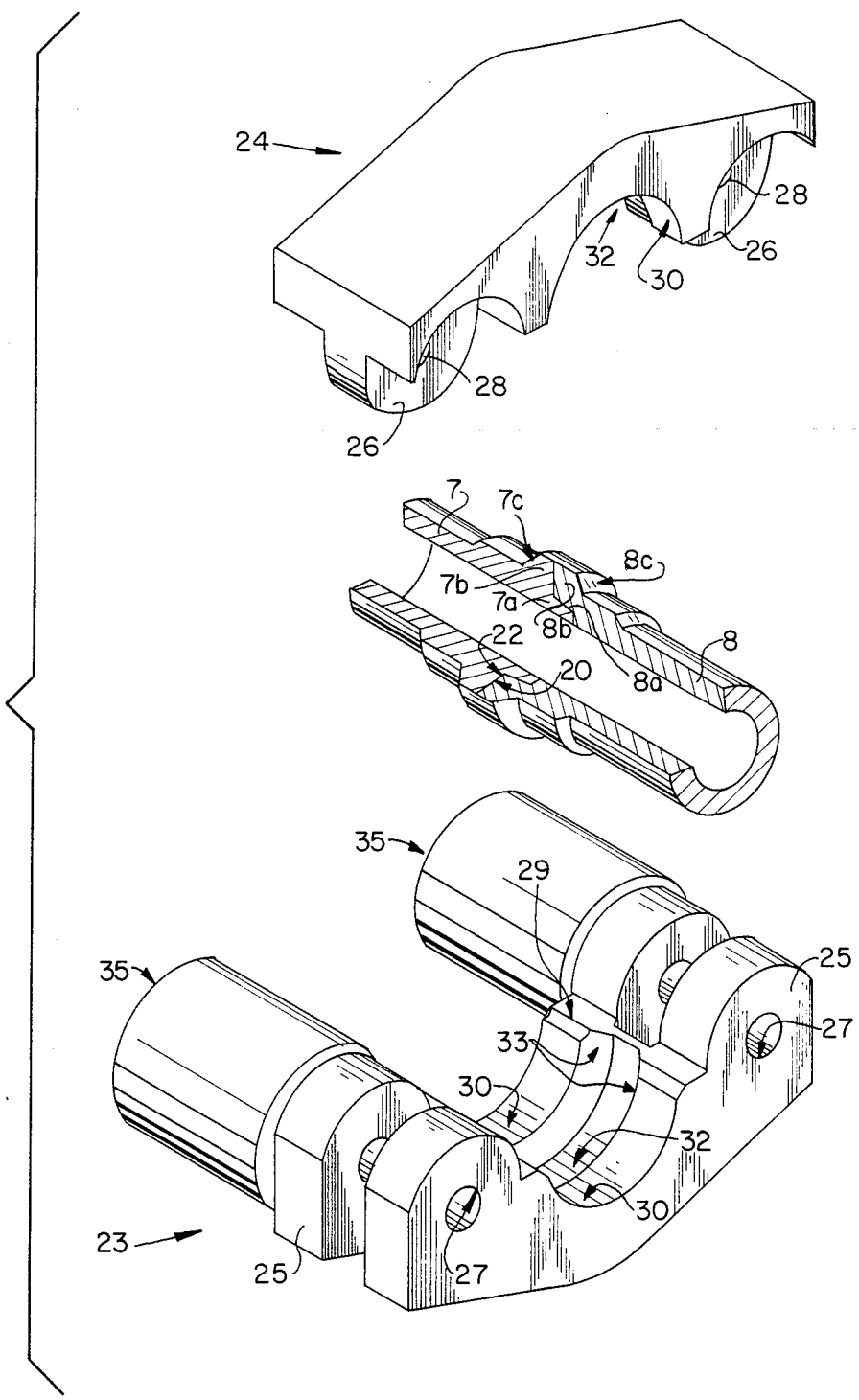
FIG. 4 is an exploded perspective with partial cross-section of the main elements constituting the coupling.

According to the invention, the tubular member 7 is provided at its end which cooperates with the tubular element 8, with a male cylindrical bearing surface 7a adapted to fit into a female housing 8a provided at the end of member 8. Tightness of this connection is completed by a seal 18. As shown in FIG. 3, the connection is made easy by complementary conical bearing surfaces 19 provided at the ends of tubular members 7 and 8. Also, and as illustrated in FIGS. 2, 3 and 4, the members 7 and 8 can abut one against the other via their annular plannar end faces, 20 and 22, respectively. The faces 20, 22 define a transverse joining plane which coincides with one of the diametral planes of the coupling. Finally, the two tubular members are each provided at their connecting end with a flange, 7b and 8b respectively, of which the face which is opposite the face contacting with the flange of the other member, is truncated at 7c and 8c. The faces 7c and 8c situated on either side of the plane joining the two members of the coupling, form angles of equal value with the longitudinal axis of the coupling.

The two tubular members 7 and 8 are associated with a locking assembly which, according to the invention, comprises two separate transverse jaws 23 and 24. As shown in more detail in FIG. 4, the jaws 23, 24 are provided at their ends with reciprocal engagement means which, in the illustrated example, are constituted, for the jaw 23, by two yoke elements 25, 25' and for the jaw 24, by two cheeks 26, 26' capable of penetrating with little play into the interval provided between the branches of the yokes 25, 25'. Said yokes and cheeks are provided with longitudinal through bores, 27 and 28 respectively.

Each of said jaws 23 and 24 comprises in its center part a plane contact face 29 into which issue two semi-cylindrical recesses 30 bordering a semi-circular groove 32. Groove 32 is provided with truncated side faces 33, having the same conicity as faces 7c and 8c of the tubular members 7 and 8 of the coupling.

When the two coupling members 7 and 8 are fitted one into the other, the two jaws 23 and 24 are assembled together so that the truncated faces 33 of the circular groove that they form abut against the faces 7c and 8c of the flanges of the two members. Faces 33 thus prevent any longitudinal separation of members 7 and 8 caused by the action of the pressure inside the coupling. The connection of the two jaws is secured by two fingers 34 FIG. 5 which are engaged into the longitudinal bores 27 and 28 provided in the yokes 25, 25' and in the cheeks 26, 26'. It should be noted that the jaws are arranged transversely and that they are in contact by their faces 29 which define a junction plane substantially perpendicular to the common longitudinal axis or parallel to one of the planes traversing the longitudinal axis of the two tubular members 7 and 8.

Each of said fingers is associated to control means which, in the embodiment illustrated in FIG. 3, is constituted by a jack 35 whose body 36 is secured by way of screws 37 against one of the side faces 38 of the corresponding yoke 23. The piston rod 39 which is movable inside the body 36, constitutes the assembling finger 34. The jack used in the illustrated example is a double-action jack and is therefore divided by the piston 39 into two chambers, a front chamber 40 and a back chamber 42, each one connected by way of supply channels 43 and 44 respectively, to a source of pressurized fluid with interposition of a control valve.

According to this embodiment, once the fingers 34 are brought into their locking position, as illustrated in FIG. 3, the back chamber 42 of the jacks are opened thus avoiding having to keep the pressure inside them for indefinite periods and to no purpose. In other words, when the coupling is being used, the assembling together of its different elements is ensured exclusively by the two fingers 34 which oppose any radial separation of the jaws and consequently, any longitudinal separation of the members 7 and 8 of the coupling.

To disconnect the parts 7 and 8 of the coupling, pressurized fluid is sent through the conduits 43 into the chambers 40 of the jacks 35. Under the effect of that pressure, the pistons 39 retract, taking with them the fingers 34 of which the free ends come into the position illustrated in dashed and dotted lines and in 45 in FIG. 3. In this position, the fingers 34 release the cheeks 26 and by way of consequence, the jaw 24. At this stage, the jaws 23-24 are separated by the radial components F exerted on them, as shown in FIG. 2. These components are the result of the decomposition, by the conical faces 33, 7c and 8c, of the force tending to longitudinally separate the members 7 and 8, which force is itself due to the pressure prevailing in the coupling. The radial separation of the two jaws thus releases the tubular members 7 and 8 of the coupling which can then come longitudinally apart, under the sole effect of the longitudinal components due to pressure, and in doing so disconnect the rigid pipe 9 from the flexible pipe 10. When there is no pressure inside the coupling, the two jaws are detached from the coupling by gravity. Moreover, when the flexible pipe is being stretched, the jaws 23 and 24 have a tendency to move apart due to the longitudinal components F1.

It should be noted that owing to the shortness of the cylindrical surfaces of engagement of the members 7 and 8, and to the use of conical bearing surfaces cooperating with radially separable jaws for disconnecting the members 7 and 8, the pressure inside said coupling causes no negative effect, and on the contrary helps the disconnection.

Figure 5:
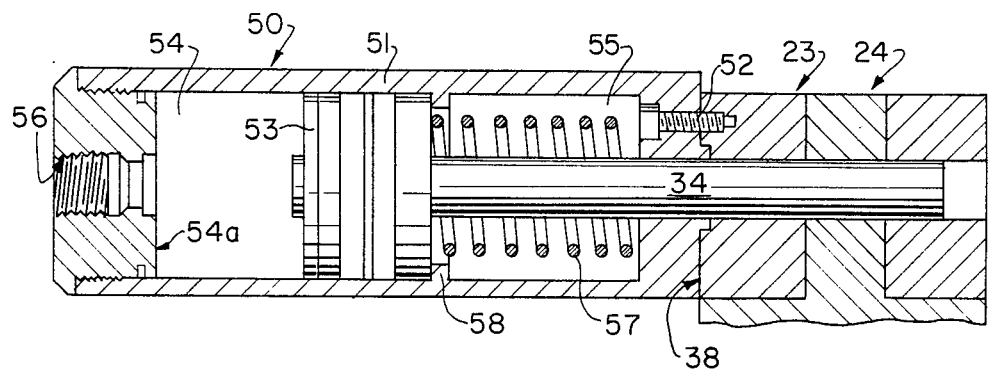
FIG. 5 is a partial longitudinal section of a variant embodiment of the means controlling the disconnection.

According to the embodiment illustrated in FIG. 5, the means controlling the movements of the fingers 34 are controlled by a jack 50, whose body 51, secured to the corresponding yoke 23 by means of screws 52, is divided, by the piston 53, into a back chamber 54 and a front chamber 55. The back chamber 54 communicates with a source of pressurized fluid via a conduit 56, whereas the chamber 55 contains a helical spring 57 adapted to move the piston 53 until the latter abuts against the face 54a of the back chamber 54. A shoulder 58 of the body limits the forward stroke of the piston and prevents total compression of the spring by the piston.

With this type of coupling, the pressure is permanently kept inside the back chamber 54 of the two means controlling the fingers 34. And to bring said fingers in the disconnecting position, it suffices to open the chamber 54 so that, as the pressure reduces inside them, the springs 57 take over and quite naturally move the pistons 53 and the fingers 34 associated thereto.

Such a device is especially advantageous as it enables to control the disconnection, even if a breakdown in the control system prevents the back chambers 54 to be opened, since it suffices then to lower the pressure in the hydraulic circuit by any other means, such as for example: by cutting off, perforating or like means.

Such releasable couplings can also be used as illustrated in FIG. 1 to connect a pipe 59 joining a ship 3 to an underwater well head 60. They can also be used to connect other type pipes, whether flexible or semi-rigid, used to transfer different materials between a fixed and a movable structure or between two movable structures.

What is claimed is:

1. A quick-release coupling, comprising:

(A) mating male and female tubular members, the male tubular member being for fitting tightly into the female tubular member in a joining area and each tubular member having, on a respective side of said joining area, a respective truncated face; and (B) a locking member for releasably locking said tubular members together, said locking member including:

(1) first and second transverse jaws located primarily on opposite sides of a junction, each said jaw being provided at its ends with engaging means which cooperate with complementary engaging means on the other said jaw when said jaws are placed together into operative engagement with one another, each said jaw including a semi-circular recess having truncated side faces adapted to come into abutment with the truncated faces of said tubular members so as to prevent said tubular members from separating from one another along the longitudinal axis of said tubular members when said jaws are in operative engagement with one another, openings formed in said jaws which define first and second longitudinal openings extending parallel to said longitudinal axis, each said opening including a portion associated with said first jaw and a portion associated with said second jaw;

(2) first and second movable locking fingers extending through said first and second openings, respectively, for locking said jaws in operative engagement with one another; and (3) control means for moving said fingers between a locking position wherein said jaws are locked together and a disconnecting position wherein said jaws are free to release from one another.

2. A coupling as defined in claim 7, wherein the control means comprises first and second hydraulic jacks, each having a body with a piston therein and a piston rod connected to said piston, each of the bodies is joined to one of the jaws and wherein each piston rod defines a respective on of said fingers.

3. A coupling as claimed in claim 2, wherein each jack body is divided by its piston into two separate chambers which are separately connectable to a source of hydraulic pressure.

4. A coupling according to claim 2, wherein each jack body comprises a back chamber connected to a source of pressure, and a front chamber containing a helical spring which is adapted to return the associated finger to its disconnecting position once the pressure in the back chambers disappears.

5. A coupling according to any one of claims 1, 2, 3 or 4, wherein the engaging means on said first jaw includes a respective yoke located on opposite ends of said first jaw, adapted to receive a respective cheek located on opposite ends of said second jaw, said cheeks defining said engaging means of said second jaw.

6. A coupling according to claim 5, wherein the jack bodies are secured laterally and on the same side of said first jaw, against an outer face of a respective one of the yokes.

* * * * *